A. A. RHOADES & W. TASH.
PULVERIZING ATTACHMENT FOR PLOWS.
No. 99,236. Patented Jan. 25, 1870.
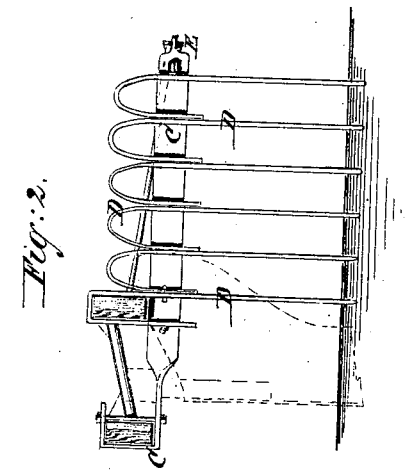
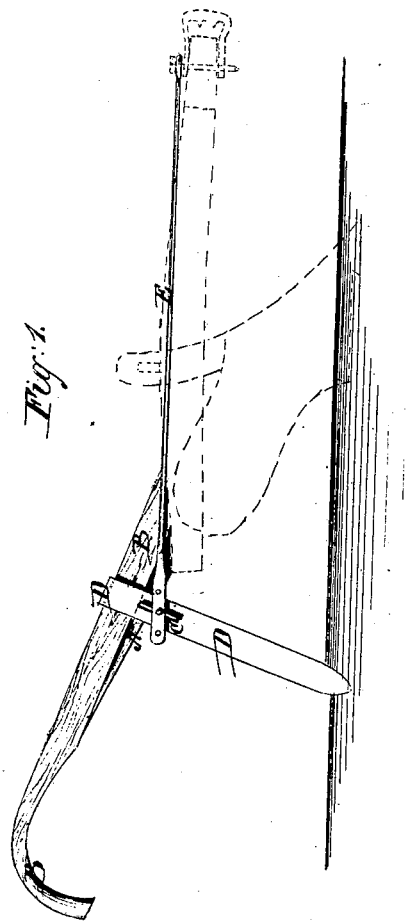

UNITED STATES PATENT OFFICE.

A. A. RHOADES AND WILEY TASH, OF BERLIN, ILLINOIS.

IMPROVED PULVERIZING ATTACHMENT FOR PLOWS.

Specification forming part of Letters Patent No. 99,236, dated January 25, 1870.

*To all whom it may concern:*

Be it known that we, ANTHONY A. RHOADES and WILEY TASH, of Berlin, in the county of Sangamon and State of Illinois, have invented a new and Improved Pulverizing Attachment for Plows; and we do hereby declare that the following is a full, clear, and exact description thereof, by which those skilled in the art can make and use the same, reference being had to the accompanying drawings, forming part of this specification, in which—

Figure 1 is a side view of our improved device as attached to the plow-handles. Fig. 2 is rear view of the same, partly in section through the handles.

Our invention has for its object to furnish an improved attachment for ordinary turn-plows, by means of which the soil may be pulverized as it is turned by the plow and while it is still moist; and it consists in the construction and combination of the various parts of the plow, as hereinafter more fully described.

A represents the landside-handle, and B the mold-board handle, of a plow, which are constructed and connected with the other parts of the plow in the ordinary manner.

C is a bar, which passes beneath the mold-board handle B, and its end is passed around and firmly but adjustably secured to the landside-handle A by a bolt and nut, as shown in Fig. 2.

D are U-shaped steel blades with one arm cut off, as shown in Fig. 2. The blades D have holes formed through them near their bends or upper ends, through which holes are passed the bar C, as shown in Figs. 1 and 2. The bend of the inner blade, D, is so formed as to fit around the mold-board handle B and support the body of the bar C. The blades D are kept in place upon the bar C by a key passed through a hole in the bar C, upon the outer side of the outer blade, D, as shown in the drawings. The intermediate blades are kept in their proper position by the elasticity of the steel bars of which they are made, and at the same time are allowed to give to pass obstructions. The outer end of the bar C is supported against the draft-strain by the adjustable brace-bar E, the rear end of which has a series of holes formed through it to receive the end of the bar C, and the forward end of which should be connected to the forward part of the plow-beam by the clevis-bolt or other convenient means.

Any desired number of blades D may be placed upon the bar C, according as it is desired to pulverize the soil more or less finely.

The depth to which the blades D enter the ground may be regulated at will by moving the device up or down upon the handles A B, the brace-bar E being adjustable accordingly.

Having thus described our invention, we claim as new and desire to secure by Letters Patent—

1. The detachable blades D, constructed and secured to the supporting-bar C, substantially in the manner herein shown and described, and for the purpose set forth.

2. The combination of the detachable blades D, adjustable supporting-bar C, and adjustable brace-bar E with each other, said parts being constructed and connected with an ordinary plow-frame, substantially as herein shown and described, and for the purpose set forth.

A. A. RHOADES.
WILEY TASH.

Witnesses:
JAMES H. YATES,
JAMES SHEAFOR.